United States Patent
Yokoyama

(10) Patent No.: US 7,486,404 B2
(45) Date of Patent: Feb. 3, 2009

(54) SIZE DIFFERENCE MEASURING METHOD AND SIZE DIFFERENCE MEASURING APPARATUS

(75) Inventor: Yuichiro Yokoyama, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 117 days.

(21) Appl. No.: 11/783,837

(22) Filed: Apr. 12, 2007

(65) Prior Publication Data

US 2007/0242278 A1  Oct. 18, 2007

(30) Foreign Application Priority Data

Apr. 14, 2006 (JP) ............................. 2006-111447

(51) Int. Cl.
*G01B 11/02* (2006.01)

(52) U.S. Cl. ....................................... 356/496

(58) Field of Classification Search ................. 356/485, 356/492, 496

See application file for complete search history.

(56) References Cited

U.S. PATENT DOCUMENTS

| | | | | |
|---|---|---|---|---|
| 3,975,100 A * | 8/1976 | Taylor | ......................... | 356/496 |
| 4,056,323 A * | 11/1977 | Ludman | ..................... | 356/496 |
| 4,083,272 A * | 4/1978 | Miller | ............................ | 82/12 |
| 4,141,150 A * | 2/1979 | Miller | ......................... | 33/558 |
| 4,142,296 A * | 3/1979 | Miller | ......................... | 33/636 |
| 5,309,221 A * | 5/1994 | Fischer et al. | ................ | 356/496 |
| 5,432,605 A * | 7/1995 | Naqwi et al. | ................. | 356/485 |
| 5,453,837 A * | 9/1995 | Naqwi et al. | ................. | 356/485 |
| 5,513,004 A * | 4/1996 | Naqwi et al. | ................. | 356/485 |
| 6,977,730 B2 * | 12/2005 | Evans | ......................... | 356/496 |
| 7,268,887 B2 * | 9/2007 | Kulawiec et al. | ............ | 356/496 |
| 2007/0242278 A1 * | 10/2007 | Yokoyama | .................. | 356/508 |

FOREIGN PATENT DOCUMENTS

JP  A 08-152317  6/1996

* cited by examiner

*Primary Examiner*—Patrick J Connolly
(74) *Attorney, Agent, or Firm*—Oliff & Berridge PLC

(57) ABSTRACT

A size difference measuring method comprising: an optical interference measuring step without wringing, of obtaining, through simultaneous measurement of interference fringes, size information relating to the end standards which are set between interferometers, by an optical interferometer without wringing that comprises: one light emitter that emits coherent light; a beam splitter; the interferometers which are arranged with predetermined separation interval between them and each of which has an optical axis in agreement with the length-measurement axes of the end standards having known preliminary values; and a first interference fringe observation device and a second interference fringe observation device; and a computing step of computing a difference of a size of the end standards, based on the interference fringe phase differences acquired as the size information of the end standards.

19 Claims, 8 Drawing Sheets

SIZE DIFFERENCE MEASURING METHOD AND SIZE DIFFERENCE MEASURING APPARATUS

RELATED APPLICATIONS

This application claims priority to the Japanese Patent Application 2006-111447 dated on Apr. 14, 2006 and is hereby incorporated with reference for all purposes.

BACKGROUND OF THE INVENTION

1. Field of the Invention

The present invention relates to a size difference measuring method and a size difference measuring apparatus, especially to accuracy enhancement of the size difference measurement between two or more end standards.

2. Prior Art

Conventionally, a contact comparator has been used for measuring size difference of an end standard to be measured using an end standard as a criterion (for example, Laid-open Japanese Patent Publication No. H8-152317).

Here, accuracy of the comparator needs to be checked. Therefore, it is checked using an end standard for calibration with higher accuracy.

For example, a pair of two end standards, whose size difference has been calibrated correctly, are used as a calibration standard for the contact comparator used in the comparative measurement of end standards, such as block gauges and length bars. The above end standards have almost the same nominal sizes, and difference of their sizes has been calibrated, for example, by optical interference measurement.

Calibration of standards is carried out by wringing two end standards onto a standard plane, such as a base plate, in parallel with each other, measuring each size by optical interference measurement and computing their difference to determine the size difference between them. The following conditions are indispensable in order to realize this measurement with high accuracy.

(1) The wringing conditions of two end standards to the base plate are equal.

(2) Because the wringing position is not free for the reasons of the detecting side, the two end standards have to stick on the base plate almost side-by-side (since the phase detection unit and the processing unit of the interferometer can only detect them when placed approximately at a predetermined position).

(3) Distortion produced by the temperature change at the time of wringing is eliminated.

However, in the above mentioned conventional system, i.e., in the optical interference measurement which needs wringing of the base plate and the end standards, realization of the above-mentioned conditions is difficult, and thus it has been difficult to realize more highly accurate size difference measurement required for calibration of the size difference between two end standards.

For this reason, technical development which can calibrate more accurately the size difference of the standards for calibration of the comparator has been strongly desired in this field, but there has been no suitable technology which can solve this problem conventionally.

SUMMARY OF THE INVENTION

The present invention was made in view of above problem in the conventional technology, and the object of the present invention is to provide a size difference measuring method and a size difference measuring apparatus which can perform size difference measurement between end standards with higher accuracy.

The present inventors had eagerly studied to improve the accuracy of size difference measurement required for the calibration of the size difference between two or more end standards, and first found out the reason why the realization of the above-mentioned conditions was difficult in the conventional system, i.e., in the optical interference measurement that needs wringing.

The reasons are explained below.

(1) Upon wringing, a wringing layer will be formed between the end standard and the base plate. Making this wringing layer with regularity and with sufficient reproducibility requires skill. Therefore, it is extremely difficult to make the wringing conditions equal for two end standards.

(2) Good or bad of the wringing condition depends dominantly on the flatness of the base plate. Thus when priority is given to the wringing condition, wringing position is difficult to be freely chosen. On the contrary, when priority is given to the wringing position, it is difficult to make the wringing condition equal.

(3) Since a wringing procedure is carried out by hand, the temperature may be more than 20° C. due to the body temperature when wringing is completed. Then, when the temperature is allowed to fall to 20° C., distortion may occur at the wringing surface and its periphery due to difference of thermal expansion coefficients, if the materials are different between the end standard and the base plate. This distortion generated in the wringing surface and its periphery influences size measurement and causes an error.

Since this influences the size measurement and causes an error, a force parallel to the flat surface of the base plate is usually given from the side face of the end standard to shift the wringing position of the end standard and release the distortion. However, under the condition of side-by-side wringing of two end standards, implementation of distortion release is physically difficult.

The present inventors elucidated the causes of the problems peculiar to the comparative measurement as above, and based thereon, found out that size difference measurement between the end standards can be performed with still higher accuracy by using the following optical interferometer without wringing. Without carrying out a wringing step, it measures interference fringes relating to at least two end standards simultaneously to obtain their size information. Thus, finally the present invention was completed.

That is to say, the size difference measuring method according to the present invention is characterized by comprising an optical interference measuring without wringing step and a computing step in order to attain the purpose.

Here, at the optical interference measuring step without wringing, using an optical interferometer without wringing comprising: a light emitter that emits coherent light; a beam splitter; a first interferometer and a second interferometer which are arranged with predetermined separation interval between them and each of which has an optical axis in agreement with the length-measurement axes of at least two end standards $BG_A$ and $BG_B$ having known preliminary values; and a first interference fringe observation device and a second interference fringe observation device, the size information of at least two end standards $BG_A$ and $BG_B$, arranged in the measuring optical path in parallel between the first interferometer and the second interferometer, is obtained by measuring the interference fringes relating to them simultaneously.

The computing step computes the difference of size $L_A$, which is the length between the opposing end faces of the end standard $BG_A$ and can be expressed with the following formula 1, and the size $L_B$, which is the length between the opposing end faces of the end standard $BG_B$ and can be expressed with the following formula 2, (the size difference $\Delta L_{AB}=L_B-L_A$), based on the interference fringe phase differences obtained as size information of end standard $BG_A$ and end standard $BG_B$ at the optical interference measuring without wringing step.

$$L_A=\lambda/2\{N_A+(\epsilon_{A4}-\epsilon_{A3})+(\epsilon_{A2}-\epsilon_{A1})\}, \qquad \text{(Formula 1)}$$

where $\lambda$: wave length of the interference light, $N_A$: the integer part of the quotient obtained by dividing size $L_A$ of the end standard $BG_A$ by $\lambda/2$, $(\epsilon_{A2}-\epsilon_{A1})$: phase difference between the reference interference fringe and the measured interference fringe relating to one end face of the end standard $BG_A$ observed by the first interference fringe observation device, $(\epsilon_{A4}-\epsilon_{A3})$: phase difference between the reference interference fringe and the measured interference fringe relating to another end face of the end standard $BG_A$ observed by the second interference fringe observation device, $$L_B=\lambda/2\{N_B+(\epsilon_{B4}-\epsilon_{B3})+(\epsilon_{B2}-\epsilon_{B1})\}, \qquad \text{(Formula 2)}$$

where $\lambda$: wave length of the interference light, $N_B$: the integer part of the quotient obtained by dividing size $L_B$ of the end standard $BG_B$ by $\lambda/2$, $(\epsilon_{B2}-\epsilon_{B1})$: phase difference between the reference interference fringe and the measured interference fringe relating to one end face of the end standard $BG_B$, observed by the first interference fringe observation device, $(\epsilon_{B4}-\epsilon_{B3})$: phase difference between the reference interference fringe and the measured interference fringe relating to another end face of the end standard $BG_B$ observed by the second interference fringe observation device.

The preliminary value referred here means the preliminarily measured value. The preliminarily measured value means the value which has been beforehand obtained by preliminary measurement of the size of the end standard to be measured, i.e., a preliminary size.

In addition, in the size difference measuring method according to the present invention, it is suitable to have a setting step provided prior to the optical interference measuring without wringing step.

Here, at the setting step, adjustment of the posture or the position of the end standard to the measuring optical path of the optical interferometer without wringing is performed using each stage which is prepared for each of the end standards respectively and which adjusts the posture or position of the end standards held thereon, for each of the stages independently.

In order to achieve the object, the size difference measuring method according to the present invention comprises an optical interferometer without wringing and a computing unit.

Here, the optical interferometer without wringing comprises: one light emitter which emits coherent light; a beam splitter; a first interferometer and a second interferometer which are arranged with predetermined separation with each other and each of which has the optical axis in agreement with the length measurement axes of the end standards having known preliminary values; and a first interference fringe observation device and a second interference fringe observation device. The above optical interferometer without wringing obtains the size information of at least two end standards $BG_A$ and $BG_B$ by measuring simultaneously the interference fringes relating to $BG_A$ and $BG_B$ arranged in the optical measurement path in parallel between the first interferometer and the second interferometer.

The computing unit computes the size difference between the end standards based on the interference fringe phase differences obtained as the size information of the end standards $BG_A$ and $BG_B$ by the optical interferometer without wringings.

The light emitter sends onto the beam splitter coherent light having a beam diameter dependent on the magnitude of the end faces of the end standards set in parallel.

The beam splitter halves the coherent light from the light emitter, sends one part onto the first interferometer, and sends the other part onto the second interferometer.

The first interferometer sends a part of coherent light sent from the beam splitter onto one end of each of the end standards where the light is reflected and returned; and it sends the remainder onto the second interferometer through the side of each of the end standards.

The second interferometer sends a part of coherent light sent from the beam splitter onto the other end of each of the end standards where the light is reflected and returned, and it sends the remainder onto the first interferometer through the side of each of the end standards.

The first interferometer also superimposes the coherent light sent from the second interferometer, which have passed through the side of each of the end standards, over the first reference light to obtain a standard interference light. The first interferometer also superimposes each reflected light, obtained by sending the coherent light from the first interferometer onto one end of each of the end standards, over the first reference light to obtain each measured interference light.

The second interferometer superimposes the coherent light sent from the first interferometer, which have passed through the side of each of the end standards, over the second reference light to obtain a standard interference light. The second interferometer also superimposes each reflected light, obtained by sending the coherent light from the second interferometer onto the other end of each of the end standards, over the second reference light to obtain each measured interference light.

The first interference fringe observation device observes simultaneously the standard interference light and each of the measured interference lights, which are obtained by the first interferometer, as interference fringes, respectively.

The second interference fringe observation device observes, simultaneously with the interference fringe observation by the first interference fringe observation device, the standard interference light and each of the measured interference lights, which are obtained by the second interferometer, as interference fringes, respectively.

The computing unit computes the difference of the size $L_A$, which is the length between the opposing end faces of the end standard $BG_A$ and expressed with the following formula 3, and the size $L_B$, which is the length between the opposing end faces of the end standard $BG_B$ and expressed with the following formula 4 ($\Delta L_{AB}=L_B-L_A$), based on the interference fringe phase differences acquired as size information of the end standards $BG_A$ and $BG_B$ by the optical interferometer without wringing.

$$L_A=\lambda/2\{N_A+(\epsilon_{A4}-\epsilon_{A3})+(\epsilon_{A2}-\epsilon_{A1})\}, \qquad \text{(Formula 3)}$$

where $\lambda$: wave length of the interference light, $N_A$: the integer part of the quotient obtained by dividing size $L_A$ of the end standard $BG_A$ by $\lambda/2$, $(\epsilon_{A2}-\epsilon_{A1})$: phase difference between the reference interference fringe and the measured interference fringe relating to one end face of the end standard $BG_A$, observed by the first interference fringe observation device, ($\epsilon_{A4}-\epsilon_{A3}$): phase difference between the reference interference fringe and the measured interference fringe relating to another end face of the end standard $BG_A$, observed by the second interference fringe observation device.

$$L_B = \lambda/2\{N_B + (\epsilon_{B4}-\epsilon_{B3}) + (\epsilon_{B2}-\epsilon_{B1})\}, \quad \text{(Formula 4)}$$

where $\lambda$: wave length of the interference light, $N_B$: the integer part of the quotient obtained by dividing size $L_B$ of the end standard $BG_B$ by $\lambda/2$, ($\epsilon_{B2}-\epsilon_{B1}$): phase difference between the reference interference fringe and the measured interference fringe relating to one end face of the end standard $BG_B$, observed by the first interference fringe observation device, ($\epsilon_{B4}-\epsilon_{B3}$): phase difference between the reference interference fringe and the measured interference fringe relating to another end face of the end standard $BG_B$, observed by the second interference fringe observation device.

The size difference measuring apparatus according to the present invention suitably comprises a stage that can adjust freely the posture or the position of the end standard held on the stage, for each of the end standards respectively.

Each of the stages comprises: a base; a top plate holding the end standard; and an adjustor for enabling the top plate to move freely relative to the base to adjust the posture or the position of the end standard to the measuring optical path of the optical interferometer without wringing, respectively. The apparatus suitably performs the adjustment of the posture or the position of the end standard to the measuring optical path of the optical interferometer without wringing, for each of the stages independently.

In the size difference measuring apparatus according to the present invention, the adjustor suitably adjusts, as the posture adjustment, a yawing angle in horizontal direction, a pitching angle in longitudinal direction, or a rolling angle in lateral direction of the end standard to the measuring optical path of the optical interferometer without wringing.

In the size difference measuring apparatus according to the present invention, each of the stages comprises plural temperature sensors and sensor dislocating devices, respectively.

Here, each of the temperature sensors is arranged with a separation distance in the longitudinal direction of the end standard, and measures the temperature of plural points of the end standard.

The sensor dislocating device enables free dislocating of the temperature sensors in the longitudinal direction of the end standard.

For every end standard, the apparatus suitably measures the temperature of plural points according to the length of the end standard for each end standard independently, and the temperature of the end standard is estimated based on the measured temperature of plural points of the end standard.

In the size difference measuring apparatus according to the present invention, the top plate suitably has high heat conductivity so that the temperature of each part of the end standard held on the top plate may become equal.

The size difference measuring apparatus according to the present invention suitably comprises thermal connection members that have high heat conductivity and connect the top plates of every the stage together so that the temperature of each of the end standards may become equal.

The material of the thermal connection member according to the present invention includes a highly heat conductive graphite sheet which has both excellent high thermal conductivity and high flexibility, as an example. This highly heat conductive graphite sheet is produced by thermal decomposition of a polymer film into graphite.

In the size difference measuring apparatus according to the present invention, the thermal connection member suitably has one or more shapes selected from the group consisting of a sheet-like shape, a mesh-like shape, a bellows-like shape, and linear line shape, so that the independent motion of each of the stages may not be disturbed by the adjustor.

The size difference measuring method (the size difference measuring apparatus) according to the present invention combines an optical interference measuring step (an optical interferometer) and a computing step (a computing unit), so that size difference measurement of the end standards can be performed with high accuracy.

In the present invention, by further providing the stages, the highly accurate size difference measurement of the end standards can be performed with higher degree of accuracy.

In the present invention, by the temperature sensors provided on the stages, the highly accurate size difference measurement of the end standards can be performed with higher degree of accuracy.

In the present invention, by the top plates provided on the stages, the highly accurate size difference measurement of the end standards can be performed with higher degree of accuracy.

In the present invention, by the thermal connection members provided on the stages, the highly accurate size difference measurement of the end standards can be performed with higher degree of accuracy.

DESCRIPTION OF THE PREFERRED EMBODIMENT

Figure 1:
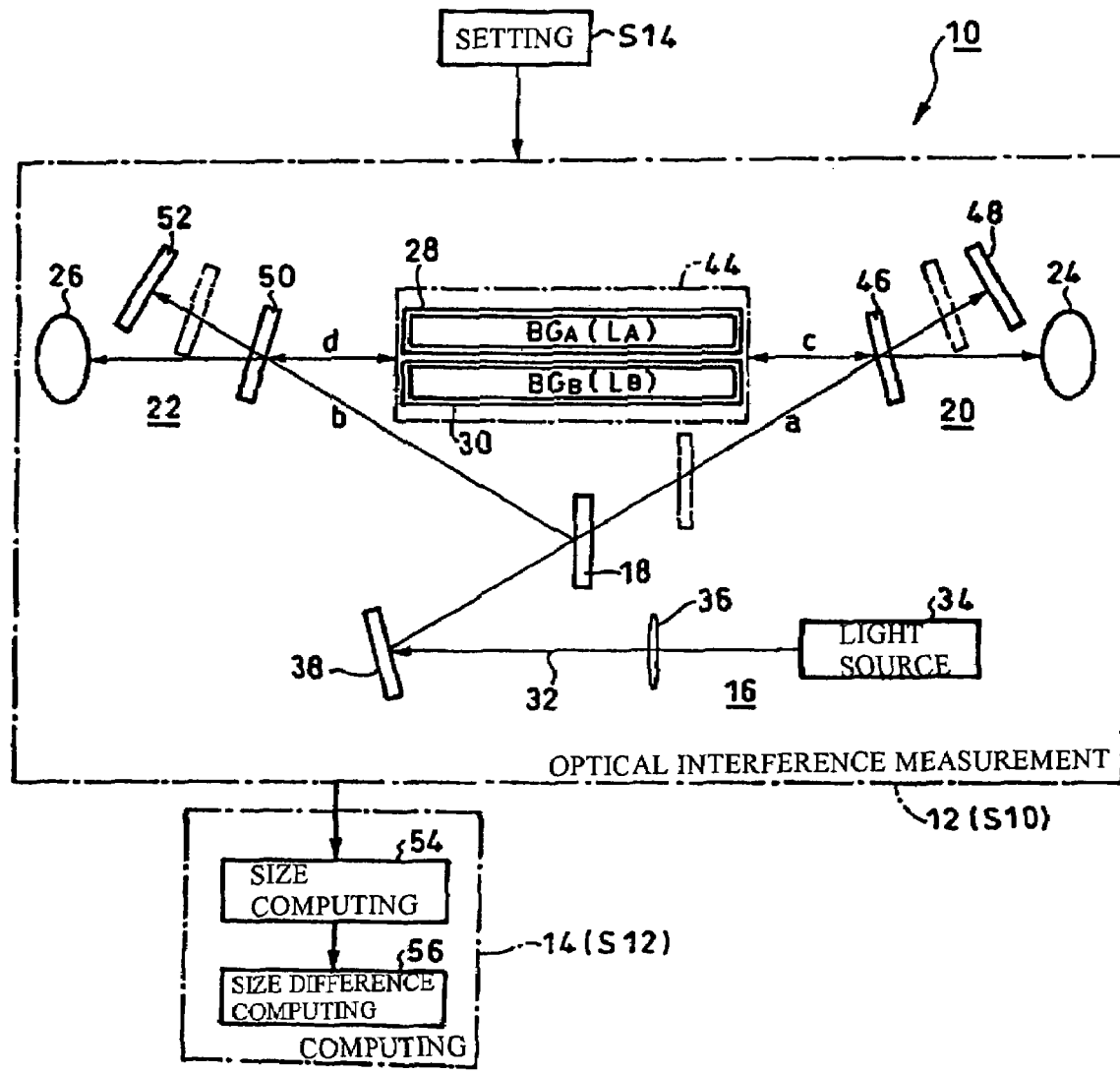
FIG. 1 is an illustration of the outline configuration of a size difference measuring apparatus for performing size difference measuring method according to one embodiment of the present invention.

Hereafter, one suitable embodiment according to the present invention is described, based on drawings, In FIG. 1, an outline constitution of a size difference measuring apparatus that performs a size difference measuring method according to one embodiment of the present invention is shown.

A size difference measuring apparatus 10 shown in the figure has an optical interferometer without wringing 12 for performing an optical interference measuring step (S10) without wringing, and a computing unit 14 for performing a computing step (S12).

The optical interferometer without wringing 12 comprises: one light emitter 16; a first half mirror (a beam splitter) 18; a first interferometer 20 and a second interferometer 22; a first screen (a first interference fringe observation device) 24 and a second screen (a second interference fringe observation device) 26; a stage 28 on which a block gauge (end standard) $BG_A$ with a known preliminary value of size $L_A$ is held; and a stage 30 on which a block gauge (end standard) $BG_B$ with a known preliminary value of size $L_B$ is held.

The light emitter 16 has a laser light source (one light source) 34 which emits laser light (coherent light) 32 with a wave length λ; a collimating lens 36; and a reflecting mirror 38.

The light emitter 16 emits laser light 32 with a beam diameter larger than the summed area of the end faces of the block gauge $BG_A$ and the block gauge $BG_B$.

The first half mirror 18 halves the laser light 32 from the light emitter 16, and sends the first split light onto the first interferometer 20, and the second split light onto the second interferometer 22.

The first interferometer 20 and the second interferometer 22 have an optical axis (a measuring optical path 44) which is in agreement with the length-measurement axes of block gauges $BG_A$ and $BG_B$, and are equipped with the second half mirror 46 and the first reference mirror 48, and the third half mirror 50 and the second reference mirror 52, arranged with predetermined separation between them.

That is, the optical interferometer without wringing 12 obtains, at the optical interference measuring step (S10) without wringing, the size information (phase differences of interference fringes) of the end standard $BG_A$ and the end standard $BG_B$, which are set in parallel in the measuring optical path 44 between the second half mirror 46 and the third half mirror 50, by performing simultaneous interference fringe measurements.

The computing unit 14 has a size computing unit 54 and a size difference computing unit 56.

The size computing unit 54 computes, at a computing step (S12), size $L_A$ of the block gauge $BG_A$ and size $L_B$ of the block gauge $BG_B$, based on the phase differences of the interference fringes obtained as size information of block gauges $BG_A$ and $BG_B$ by the optical interferometer without wringing 12.

The size difference computing unit 56 computes the difference between the size $L_A$ of the block gauge $BG_A$ and the size $L_B$ of the block gauge $BG_B$ obtained by the size computing unit 54, at the computing step (S12).

The present embodiment comprises the stages 28 and 30 for performing the setting step (S14) provided prior to the optical interference measuring step (S10) without wringing.

The stage 28 holds the block gauge $BG_A$ and performs alignment (adjustment of the posture or the position) of the block gauge $BG_A$ to the measuring optical path 44. The stage 30 holds the block gauge $BG_B$ and performs alignment (adjustment of posture or position) of the block gauge $BG_B$ to the measuring optical path 44. In this embodiment, alignment of the block gauge $BG_A$ by the stage 28 and alignment of the block gauge $BG_B$ by the stage 30 are performed independently.

The size difference measuring apparatus 10 according to the present embodiment is generally constituted as above, and the operation thereof is explained below.

Using the size difference measuring apparatus 10 according to the present embodiment, the size information of the block gauges $BG_A$ and $BG_B$ is obtained simultaneously through interference fringe measurement by the optical interferometer without wringing 12, so that the size difference between block gauges $BG_A$ and $BG_B$ can be simultaneously measured only by aligning block gauges $BG_A$ and $BG_B$ in parallel in the measuring optical path of the optical interferometer without wringing, without wringing between the base plate and the block gauges. Thereby, accuracy enhancement of the size difference measurement between the block gauges $BG_A$ and $BG_B$ can be easily achieved.

Moreover, by using the size difference measuring apparatus 10 of the present embodiment, the optical interferometer without wringing 12 can measure simultaneously the interference fringes of block gauges $BG_A$ and $BG_B$ to obtain the size information, and the sizes of block gauges $BG_A$ and $BG_B$ can be measured under more similar environment. Thereby, the above simple size difference measurement between the block gauges $BG_A$ and $BG_B$ can be done with higher accuracy.

Above described operations are explained below more concretely.

A characteristic feature of the present embodiment is that, out of a number of size difference measuring methods, the combination of the optical interference measuring step (S10) without wringing and the computing step (S12) are adopted, and for this reason, a setting step (S14), an optical interference measuring step (S10) without wringing, and a computing step (S12) described below, are performed in the present embodiment.

<Setting Step>

At the setting step (S14), the stage 28 holds block gauge $BG_A$ and adjusts the posture or position of the block gauge $BG_A$ to the measuring optical path 44, and the stage 30 holds the block gauge $BG_B$ and adjusts the posture and position of the block gauge $BG_B$ to the measuring optical path 44, so that the block gauges $BG_A$ and $BG_B$ may be arranged in parallel within the measuring optical path 44 of the optical interferometer without wringing 12.

In the present embodiment, each of the stages 28 and 30 can adjust independently to each other the inclination (the pitching angle, the rolling angle, and the yawing angle) or the position (X, Y, and Z position) of the corresponding gauge block $BG_A$ or $BG_B$ to the measuring optical path 44 so that desired interference fringes may be observed on each of the screens 24 and 26.

<Optical Interference Measuring Step without Wringing>

After completion of the above setting step (S14), at the optical interference measuring step (S10) without wringing, the size information (phase differences of interference fringes) of the block gauges $BG_A$ and $BG_B$ having known preliminary values are obtained simultaneously, through measuring interference fringes by the optical interference measurement without wringing.

Specifically speaking, the laser light 32 emitted from the laser light source 34 is collimated by the collimating lens 36 to light having a beam diameter of required magnitude, and is sent to the first half mirror 18 through the reflecting mirror 38.

In the present embodiment, the beam diameter of the laser light 32 is adjusted so that simultaneous interference fringe measurement for obtaining the size information (phase differences of interference fringes) of the gauge blocks $BG_A$ and $BG_B$ can be carried out with higher certainty.

For this reason, in the present embodiment, the beam diameter of the laser light 32 is made larger than the sum of the areas of the end faces of block gauges $BG_A$ and $BG_B$, so that a part of laser light 32 simultaneously reaches both of the end faces of the block gauges $BG_A$ and $BG_B$; and the remainder may pass through the side of each of the block gauges $BG_A$ and $BG_B$ to reach the second half mirror 46 or the third half mirror 50. Thus, each split light (measuring light) simultaneously reaches three positions, respectively: both end faces of the block gauge $BG_A$, both end faces of the block gauge $BG_B$, and the sides (perimeters) of these block gauge end faces, as follows.

At the second half mirror 46, a part of the first split light is sent to the right end faces of block gauges $BG_A$ and $BG_B$ where the light is reflected and returned; and the remainder passes through the side of each of the block gauges $BG_A$ and $BG_B$ to reach the third half mirror 50.

At the third half mirror 50, a part of the second split light is sent to the left end faces of block gauges $BG_A$ and $BG_B$ where the light is reflected and returned; and the remainder passes through the side of each of the block gauges $BG_A$ and $BG_B$ to reach the second half mirror 46.

The second half mirror 46 superimposes the coherent light from the third half mirror 50 which have passed through the side of each of the block gauges $BG_A$ and $BG_B$ over the first reference light from the first reference mirror 48 to obtain the standard interference light. The second half mirror 46 also superimposes the each reflected light, which is obtained by sending the coherent light from the second half mirror 46 onto the right end face of each of block gauges $BG_A$ and $BG_B$, over the first reference light from the first reference mirror 48 to obtain each measured interference light.

The third half mirror 50 superimposes the coherent light from the second half mirror 46 which have passed through the side of each of the block gauges $BG_A$ and $BG_B$ over the second reference light from the second reference mirror 52 to obtain the standard interference light. The third half mirror 50 also superimposes the each reflected light, which is obtained by sending the coherent light from the third half mirror 50 onto the left end face of each of block gauges $BG_A$ and $BG_B$, over the second reference light from the second reference mirror 52 to obtain each measured interference light.

At the first screen 24, the standard interference light and the measured interference light relating to each of the block gauges $BG_A$ and $BG_B$ obtained by the second half mirror 46 are simultaneously observed as interference fringes, respectively.

At the second screen 26, the standard interference light and the measured interference light relating to each of the block gauges $BG_A$ and $BG_B$ obtained by the third half mirror 50 are observed as interference fringes, respectively, simultaneously with the interference fringe observation by the first interference fringe observation device.

In the present embodiment, as seen above, the size information of the two block gauges $BG_A$ and $BG_B$ is simultaneously obtained through the measurement of interference fringes by the optical interferometer without wringing 12. As a result, in the present embodiment, the sizes of the two block gauges $BG_A$ and $BG_B$ are measured under the same environment, and thus, calculation of the size difference between the two block gauges $BG_A$ and $BG_B$ based on these differences can be performed with high accuracy.

Moreover, in the present embodiment, by employing the optical interferometer without wringing 12, the size difference between the two block gauges $BG_A$ and $BG_B$ are obtained based on the sizes of the two block gauges $BG_A$ and $BG_B$ obtained by performing interference fringe measurement for the size information of the two block gauges $BG_A$ and $BG_B$, without wringing of the two block gauges $BG_A$ and $BG_B$ to the base plate.

As a result, in the setting step, a conventional wringing operation between the block gauge and the base plate is avoided and an easy alignment operations between the measuring optical path and the block gauges by the stages are only conducted, which improves workability. In the present embodiment, since the alignment can be independently performed for each stage, it can be carried out independently for each block gauge. For this reason, in the present embodiment, an operation required for the setting step can be easily done, irrespective of the mutual arrangement positions of the block gauges. Moreover, in the later optical interference measuring without wringing step, adverse effects caused by the alignment condition between the block gauges can be certainly reduced.

<Computing Step>

In the computing step (S12), the computing unit 14 can compute the size $L_A$ between the opposing right and left end faces of the block gauge $BG_A$, for example, by applying coincidence method to the $N_A$, which is the integral part of the quotient obtained by dividing size $L_A$ of the block gauge $BG_A$ by $\lambda/2$, and the phase difference information, $(\epsilon_{A4}-\epsilon_{A3})$ and $(\epsilon_{A2}-\epsilon_{A1})$, obtained in the optical interference measuring process (S10) without wringing, using the following formula 5.

The computing unit 14 can also compute the size $L_B$ between the opposing right and left end faces of the block gauge $BG_B$, by applying, for example coincidence method to $N_B$, which is the integral part of the quotient obtained by dividing size $L_B$ of the block gauge $BG_B$ by $\lambda/2$, and the phase difference information, $(\epsilon_{B4}-\epsilon_{B3})$ and $(\epsilon_{B2}-\epsilon_{B1})$, obtained in the optical interference measuring process (S10) without wringing, using the following formula 6.

$$L_A=\lambda/2\{N_A+(\epsilon_{A4}-\epsilon_{A3})+(\epsilon_{A2}-\epsilon_{A1})\}, \quad \text{(Formula 5)}$$

where $\lambda$: wave length of the interference light 32, $N_A$: the integer part of the quotient obtained by dividing size $L_A$ of the block gauge $BG_A$ by $\lambda/2$, $(\epsilon_{A2}-\epsilon_{A1})$: phase difference between the reference interference fringe and the measured interference fringe relating to the right end face of the block gauge $BG_A$, observed on the first screen 24, $(\epsilon_{A4}-\epsilon_{A3})$: phase difference between the reference interference fringe and the measured interference fringe relating to the left end face of the block gauge $BG_A$, observed on the second screen 26.

$$L_B=\lambda/2\{N_B+(\epsilon_{B4}-\epsilon_{B3})+(\epsilon_{B2}-\epsilon_{B1})\}, \quad \text{(Formula 6)}$$

where $\lambda$: wave length of the laser light 32, $N_B$: the integer part of the quotient obtained by dividing size $L_B$ of the block gauge $BG_B$ divided by $\lambda/2$, $(\epsilon_{B2}-\epsilon_{B1})$: phase difference between the reference interference fringe and the measured interference fringe relating to the right end face of the block gauge $BG_B$, observed on the first screen 24, $(\epsilon_{B4}-\epsilon_{B3})$: phase difference between the reference interference fringe and the measured interference fringe relating to the left end face of the block gauge $BG_B$, observed on the second screen 26.

The computing unit 14 computes the difference between the size $L_A$ and the size $L_B$ ($\Delta L_{AB}=L_B-L_A$), as mentioned above.

Here, since the size information of the block gauges $BG_A$ and $BG_B$ used for calculating the size difference between the two block gauges $BG_A$ and $BG_B$ are measured under the same environment, the size difference between the two block gauges $BG_A$ and $BG_B$ can be computed with high accuracy.

By the way, in order to carry out interference fringe measurement to obtain the size difference information of the block gauges $BG_B$ and $BG_B$ simultaneously, with certainty, adjustment of the beam diameter of the measuring light, i.e., the beam diameter of the laser light 32, and simultaneous observation of interference fringes are extremely important in the present embodiment, as mentioned above.

These characteristics are explained more concretely below.

<Adjustment of Beam Diameter>

Figure 2A:
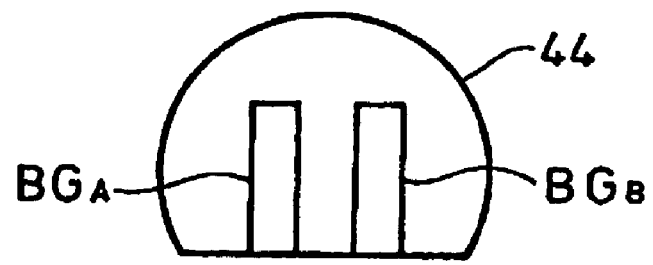
FIG. 2 is an illustration of the simultaneous measurement of end standards by the size difference measuring apparatus shown in FIG. 1.
Figure 2B:
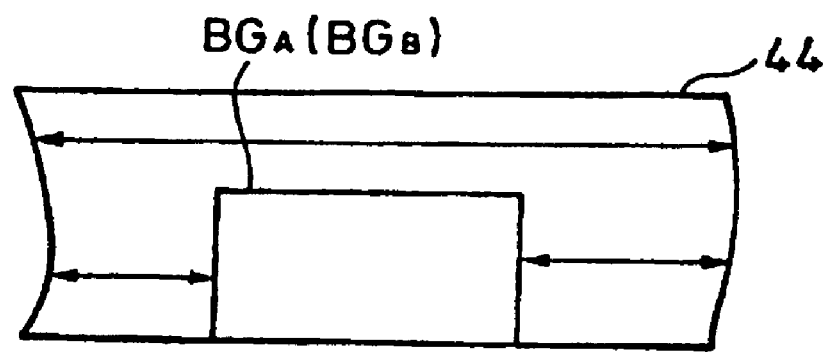
Figure 2C:
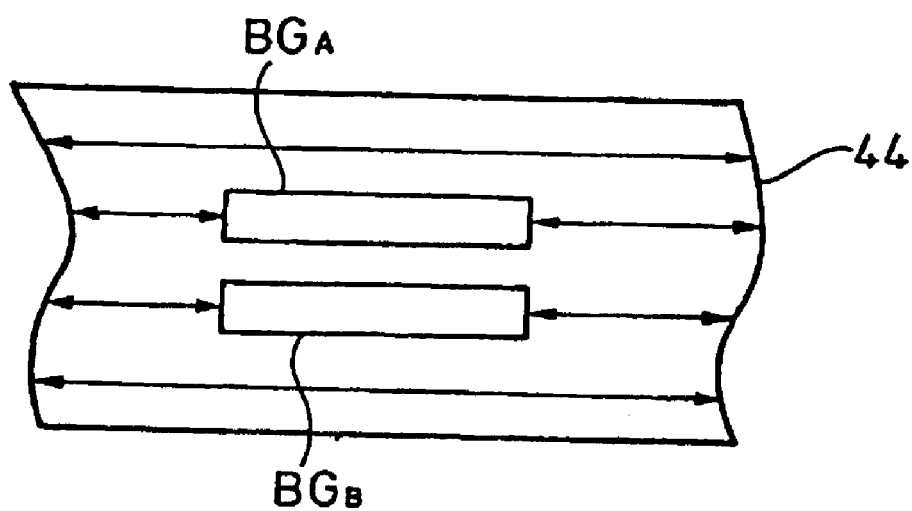

FIG. 2 (A) is an illustration showing the block gauges $BG_A$ and $BG_B$ viewed from the optical axis direction, FIG. 2 (B) is an illustration showing the block gauges $BG_A$ and $BG_B$ from the side, and FIG. 2 (C) is an illustration showing the block gauges $BG_A$ and $BG_B$ from the upper direction.

As clearly seen from these figures, in the present embodiment, the cross-sectional area perpendicular to the optical-axis of the measuring optical path 44, i.e., the beam diameter of the laser light, is larger than the sum of the areas of two block gauges $BG_A$ and $BG_B$ and their perimeter, and the laser light is sent simultaneously onto both end faces of the two block gauges $BG_A$ and $BG_B$ and their perimeter.

Thereby, the simultaneous measurement of the size information of the two block gauges $BG_A$ and $BG_B$ by optical interference measurement without wringing can be performed with more certainty.

Figure 3A:
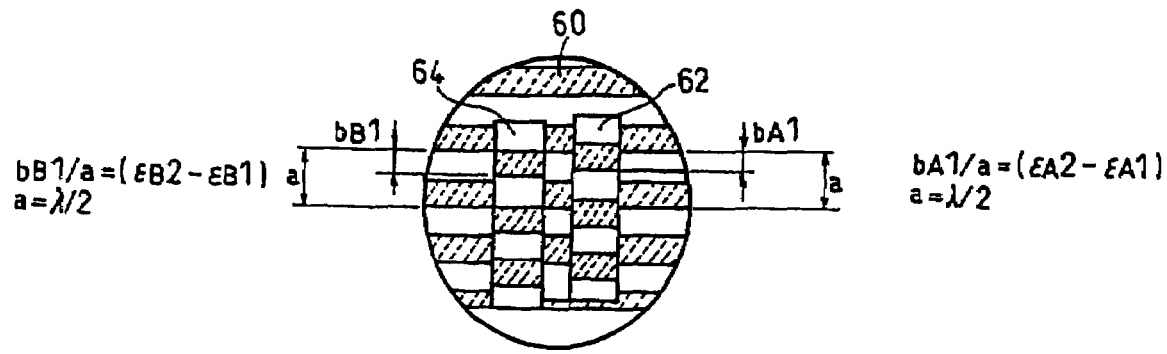
FIG. 3 is an illustration of the simultaneous measurement of each of interference fringes by the size difference measuring apparatus shown in FIG. 1.
Figure 3B:
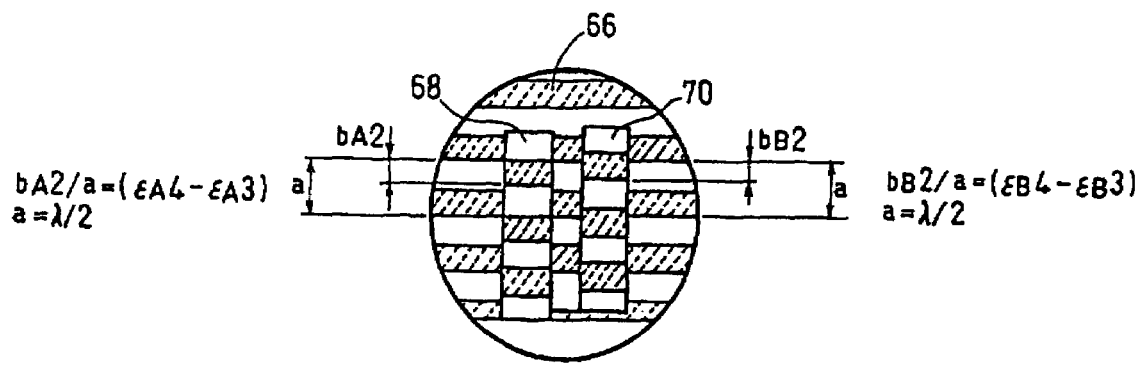

Moreover, in the present embodiment, observation of the reference interference fringe and each of the measured interference fringes on the first screen 24 as shown in FIG. 3 and observation of the reference interference fringe and each of the measured interference fringes on the second screen 26 are all performed simultaneously.

Thereby, in the present embodiment, the simultaneous measurement of the two block gauges $BG_A$ and $BG_B$ by the optical interference measurement without wringing can be performed with more certainty.

That is, from the first screen 24, the phase difference ($b_{A1}$/a) between the first reference interference fringe 60 and the first measured interference fringe 62 relating to the right end face of the block gauge $BG_A$, as shown in FIG. 3 (A), is read out. This is the phase difference ($\epsilon_{A2}-\epsilon_{A1}$) information relating to the right end face of the block gauge $BG_A$.

From the first screen 24, the phase difference ($b_{B1}$/a) between the first reference interference fringe 60 and the first measured interference fringe 64 relating to the right end face of the block gauge $BG_B$ is read out. This is the phase difference ($\epsilon_{B2}-\epsilon_{B1}$) information relating to the right end face of the block gauge $BG_B$.

From the second screen 26, the phase difference ($b_{A2}$/a) between the second reference interference fringe 66 and the second measured interference fringe 68 relating to the left end face of block gauge $BG_A$, as shown in FIG. 3 (B), is read out at the same time. This is the phase difference ($\epsilon_{A4}-\epsilon_{A3}$) information relating to the left end face of the block gauge $BG_A$.

From the second screen 26, the phase difference ($b_{B2}$/a) between the second reference interference fringe 66 and the second measured interference fringe 70 relating to the left end face of the block gauge $BG_B$ is read out at the same time. This is the phase difference ($\epsilon_{B4}-\epsilon_{B3}$) information of the block gauge $BG_B$.

With this simultaneous measurement of all of each interference fringe, the simultaneous measurement of the size information of the two block gauges $BG_A$ and $BG_B$ by the optical interference measurement without wringing can be performed with more certainty. As a result, since the sizes of the two block gauges $BG_A$ and $BG_B$ are measured under the same environment, the size difference between them can be obtained with higher accuracy.

The computing method of each block gauge size is explained more specifically below.

In this figure, the size $L_A$ of the block gauge $BG_A$ is explained.

When distances between each of the optical components are set to a, b, $c_A$, and $d_A$, respectively, and each optical path length of the measuring light is set to $L_{A1}$, $L_{A2}$, $L_{A3}$, and $L_{A4}$, respectively, the size $L_A$ of the block gauge $BG_A$ is given as follows.

Here, in the present embodiment, optical path length between the first half mirror 18 and the second half mirror 46 is set to a, optical path length between the first half mirror 18 and the third half mirror 50 is set to b, optical path length between the second half mirror 46 and the right end face of the block gauge $BG_A$ is set to $c_A$, and also optical path length between the third half mirror 50 and the left end face of the block gauge $BG_A$ is set to $d_A$.

In the present embodiment, optical path length $L_{A1}$ is set to the optical path length connecting sequentially the first half mirror 18, the second half mirror 46, the right end face of the block gauge $BG_A$, and again the second half mirror 46; optical path length $L_{A2}$ is set to the optical path length connecting sequentially the first half mirror 18, the third half mirror 50, the left end face of block gauge $BG_A$, and again the third half mirror 50; and optical path length $L_{A3}$ is set to the optical path length connecting sequentially the first half mirror 18, the third half mirror 50, through the side of the block gauge $BG_A$, and the second half mirror 46; and optical path length $L_{A4}$ is set to the optical path length connecting sequentially the first half mirror 18, the second half mirror 46, through the side of the block gauge $BG_A$, and the third half mirror 50.

The relations of the optical path lengths: $L_{A1}$, $L_{A2}$, $L_{A3}$, and $L_{A4}$ can be expressed by the following formulas 7 and 8.

$$L_{A3}-L_{A1}=(b+d_A+c_A+L_A)-(a+2c_A) \qquad \text{(Formula 7)}$$

$$L_{A4}-L_{A2}=(a+c_A+d_A+L_A)-(b+2d_A) \qquad \text{(Formula 8)}$$

The sum of the above formula 7 and formula 8 can be expressed by the following formula 9.

$$L_{A3}-L_{A1}+L_{A4}-L_{A2}=(a+b+2c_A+2d_A+2L_A)-(a+b+2c_A+2d_A)=2L_A \qquad \text{(Formula 9)}$$

Modifying the above formula 9, we obtain the following formula 10.

$$L_A=\tfrac{1}{2}\{(L_{A3}-L_{A1})+(L_{A4}-L_{A2})\} \qquad \text{(Formula 10)}$$

Here, $L_{A1}$, $L_{A2}$, $L_{A3}$, and $L_{A4}$ can be expressed by the following formula 11 to the formula 14, when the wave length $\lambda$ of the laser light (from the laser light source) is used.

$$L_{A1}=\lambda(N_{A1}+\epsilon_{A1}) \qquad \text{(Formula 11)}$$

$$L_{A2}=\lambda(N_{A2}+\epsilon_{A2}) \qquad \text{(Formula 12)}$$

$$L_{A3}=\lambda(N_{A3}+\epsilon_{A3}) \qquad \text{(Formula 13)}$$

$$L_{A4}=\lambda(N_{A4}+\epsilon_{A4}) \qquad \text{(Formula 14)}$$

Where, $N_{A1}$ to $N_{A4}$ are the integer parts and $\epsilon_{A1}$ to $\epsilon_{A4}$ are the fraction parts (phases), respectively, of the quotients obtained by dividing the light path lengths $L_{A1}$ to $L_{A4}$ by $\lambda/2$, where $\lambda$ is the wavelength. Substituting these into the above formula 10, the size $L_A$ can be expressed by the following formulas 15 and 16.

$$L_A=\lambda/2\{(N_{A3}-N_{A1})+(N_{A4}-N_{A2})+(\epsilon_{A3}-\epsilon_{A1})+(\epsilon_{A4}-\epsilon_{A2})\} \qquad \text{(Formula 15)}$$

$$L_A=\lambda/2\{N_A+(\epsilon_{A3}-\epsilon_{A1})+(\epsilon_{A4}-\epsilon_{A2})\}, \qquad \text{(Formula 16)}$$

where $(N_{A3}-N_{A1})+(N_{A4}-N_{A2})=N_A$.

Therefore, the size $L_A$ of the block gauge $BG_A$ is obtained from the above mentioned formula 16 using the phase difference ($\epsilon_{A3}-\epsilon_{A1}$) obtained from the interference fringes in the view plane on the first screen, the phase difference ($\epsilon_{A4}-\epsilon_{A2}$)

obtained from the interference fringes in the view plane on the second screen, and the known wave length $\lambda$ and the preliminary value $N_A$.

The size $L_B$ of the block gauge $BG_B$ is obtained in the same way as the size $L_A$ of the block gauge $BG_A$ by replacing the subscript A in the formula by the subscript B.

Thus, according to the present embodiment, since such size measurement of the two block gauges without wringing is performed simultaneously, the size difference between the two block gauges can be obtained with higher accuracy. Such extremely excellent effects of the present invention can be obtained by the discovery of a useful combination of the optical interference measuring without wringing step and the computing step, based on the present inventors' elucidation of the cause of the unique problem in the size difference measurement.

That is, as a result of the repeated eager studies to enhance the accuracy of the size difference measurement of the block gauges, the present inventors have noticed that release from wringing is a very important point, and have adopted the optical interference method without wringing out of a number of measuring methods.

Here, when two block gauges are to be measured in the conventionally way, it may be considered that one block gauge is set in the apparatus and measured, and the same operation is repeated on every block gauge. But uncertainty may become large in this procedure. On the other hand, the present invention reduces the above uncertainty substantially by installing the two block gauges in the same measuring optical path, and carrying out the simultaneous interference fringe measurements to obtain the size information of the two block gauges. That is, since the present invention measures the sizes of the two block gauges under a completely same environment, it can offset the uncertainty factor due to the environment when computing the size difference between the two block gauges.

When the two block gauges are installed in the same measuring optical path, it is usual that the two block gauges are placed on one stage.

However, when these are measured simultaneously, their postures and arrangements may affect each other.

Thus, the present invention substantially reduces these effects by setting each one block gauge on each one stage and controlling independently the posture of each block gauge.

Because the present invention is constituted in this way, the uncertainty factor about the size difference measurement between the block gauges can be substantially reduced, so that the size difference measurement of the block gauges are performed with higher accuracy.

Accuracy Enhancement

By the way, in the present embodiment, to perform the size difference measurement with higher accuracy, it is also preferable to adopt the following size difference measurement and the stages.

That is, when measurement with higher accuracy is required, such as when the size difference between gauges with long nominal sizes are measured, thermal expansion coefficient is preferably corrected individually, using the value measured with higher accuracy.

Upon temperature measurement, it is preferable to measure the temperature one by one and use it for the correction, instead of using a result of measurement with one temperature sensor as the representative value. In the interference measurement, plural wave lengths can be used, like in the case of usual size measurement, to improve safety of the measurement using the coincidence method.

The above size difference measurement with higher accuracy is explained specifically below.

<Measurement Temperature>

In order to perform a highly accurate size difference measurement, it is also extremely important to take into account the thermal expansion of the block gauge size, as follows.

As in the above cases, using the size difference measuring apparatus shown in FIG. 1, the two block gauges $BG_A$ and $BG_B$ are inserted into the measuring optical path of the optical interference measuring system without wringing, and interference fringe measurement relating to the both end faces of the block gauge $BG_A$ and the both end faces of the block gauge $BG_B$ are simultaneously carried out by the optical interferometer without wringing. The preliminary values (the preliminary sizes), the median size differences (the difference obtained by subtracting the preliminary value (the preliminary size) from the median size), the linear expansion coefficients, the temperatures (deviations from 20° C.), and the phase correction values, of the two block gauges $BG_A$ and $BG_B$ inserted in the measuring optical path, are set to $L_{0A}$, $\Delta L_A$, $\alpha_A$, $\Delta T_A$ and $C_{PA}$ for the block gauge $BG_A$, and to $L_{0B}$, $\Delta L_B$, $\alpha_B$, $\Delta T_B$ and $C_{PB}$ for the block gauge $BG_B$. And, when the wave length of the laser light in vacuum is $\lambda$ and the refractive index of the air is n, the median size differences $\Delta L_A$ and $\Delta L_B$ of the block gauges $BG_A$ and $BG_B$ can be expressed by the following formulas 17 and 18, respectively.

$$\Delta L_A = \frac{\lambda}{2n}(N_A + \varepsilon_A) - L_{0A}(1 + \alpha_A \Delta T_A) + C_{PA} \quad \text{(Formula 17)}$$

$$\Delta L_B = \frac{\lambda}{2n}(N_B + \varepsilon_B) - L_{0B}(1 + \alpha_B \Delta T_B) + C_{PB} \quad \text{(Formula 18)}$$

where $N_A$ and $N_B$ are the integer parts (preliminary values (the preliminary sizes)) and $\varepsilon_A$ and $\varepsilon_B$ are the fraction parts, respectively, of the interference fringe order for the sizes of the block gauges $BG_A$ and $BG_B$.

From the above formulas 17 and 18, the level difference (median size difference) $\Delta L_{AB}$ subtracted by the preliminary level difference (the value of the level difference obtained by the preliminary measurement) for the two block gauges $BG_A$ and $BG_B$ can be expressed by the following formula 19.

$$\begin{aligned}\Delta L_{AB} &= \Delta L_A - \Delta L_B \quad \text{(Formula 19)} \\ &= \left[\frac{\lambda}{2n}(N_A + \varepsilon_A) - L_{0A}(1 + \alpha_A \Delta T_A) + C_{PA}\right] - \\ &\quad \left[\frac{\lambda}{2n}(N_B + \varepsilon_B) - L_{0B}(1 + \alpha_B \Delta T_B) + C_{PB}\right] \\ &= \frac{\lambda}{2n}(N_A - N_B + \varepsilon_A - \varepsilon_B) - \\ &\quad [L_{0A}(1 + \alpha_A \Delta T_A) - L_{0B}(1 + \alpha_B \Delta T_B)] + (C_{PA} - C_{PB})\end{aligned}$$

Here, both of the linear expansion coefficients $\alpha_A$ and $\alpha_B$ of the block gauges $BG_A$ and $BG_B$ can be expressed by the following formula 20 by using the catalog representative value $\alpha$.

$$\alpha_A = \alpha_B = \alpha \quad \text{(Formula 20)}$$

The measurement temperatures, $\Delta T_A$ and $\Delta T_B$, of the block gauges $BG_A$ and $BG_B$ can be expressed by the following formula 21 by using the measurement result ΔT by one temperature sensor, as the representative value for the block gauges $BG_A$ and $BG_B$.

$$\Delta T_A = \Delta T_B = \Delta T$$

$$\Delta T_A = \Delta T_B = \Delta T \quad \text{(Formula 21)}$$

$C_{PB}$ of the block gauges $BG_A$ and $BG_B$ respectively, this can be expressed by the following formula 22

$$C_{PA} = C_{PB} = C_P \quad \text{(Formula 22)}$$

Considering the above formula 20 to the formula 22, the above formula 19 can be rewritten as the following formula 23.

$$\Delta L_{AB} = \frac{\lambda}{2n}(N_A - N_B + \varepsilon_A - \varepsilon_B) - (L_{0A} - L_{0B})(1 + \alpha \Delta T) \quad \text{(Formula 23)}$$
$$= \frac{\lambda}{2n}(\Delta N_{AB} + \Delta \varepsilon_{AB}) - \Delta L_{0AB}(1 + \alpha \Delta T)$$

where $N_A - N_B = \Delta N_{AB}$, $\varepsilon_A - \varepsilon_B = \Delta \varepsilon_{AB}$, $L_{0A} - L_{0B} = \Delta L_{0AB}$ $N_A - N_B = \Delta N_{AB}$, $\varepsilon_A - \varepsilon_B = \Delta \varepsilon_{AB}$, $L_{0A} - L_{0B} = \Delta L_{0AB}$ Therefore, the size difference can be measured with higher accuracy by measuring the fraction difference $\Delta \varepsilon_{AB}$ in the above formula 23 by the optical interferometer without wringing shown in FIG. 1.

As for the integer part $\Delta N_{AB}$ in the above formula 23, the important point is that the two block gauges $BG_A$ and $BG_B$ are arranged in the same measuring optical path, and sizes thereof are measured simultaneously.

Conventional measurement of two block gauges is usually done in two measurement procedures, each one at a time, so that uncertainty is large.

On the other hand, in the present embodiment, since the sizes of the two block gauges $BG_A$ and $BG_B$ are measured completely in the same environment as mentioned above, uncertainty factors due to the environment can be offset when the difference between them are computed.

<Stage>

In order to perform the size difference measurement with higher accuracy, it is very important to measure the size difference of the two block gauges $BG_A$ and $BG_B$ appropriately without being restricted by their locating positions and the arrangement states; and for this purpose, it is also preferable to use the stages as explained below:

(1) Independent Control of Posture of Each of Stages (Block Gauges)

That is, each of stages 28 (30) is preferable to be further equipped with the following adjustor, respectively, for the size difference measurement with higher accuracy according to the present embodiment.

The present invention is characterized in that each of stages has posture adjustors (adjustors of the yawing angle, the pitching angle, and the rolling angle), respectively, and the posture of the block gauge mounted on each stage can be finely adjusted independently.

Figure 4A:
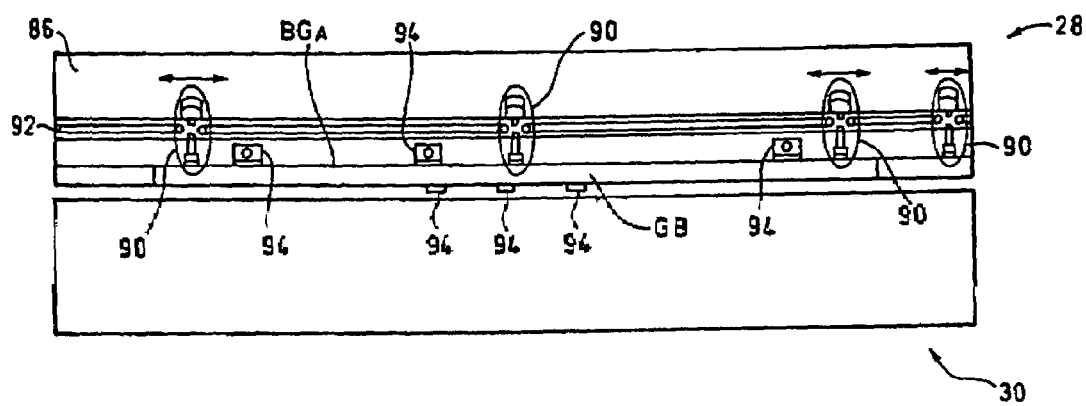
FIG. 4 is an illustration of the outline configuration of a stage of the size difference measuring apparatus shown in FIG. 1.
Figure 4B:
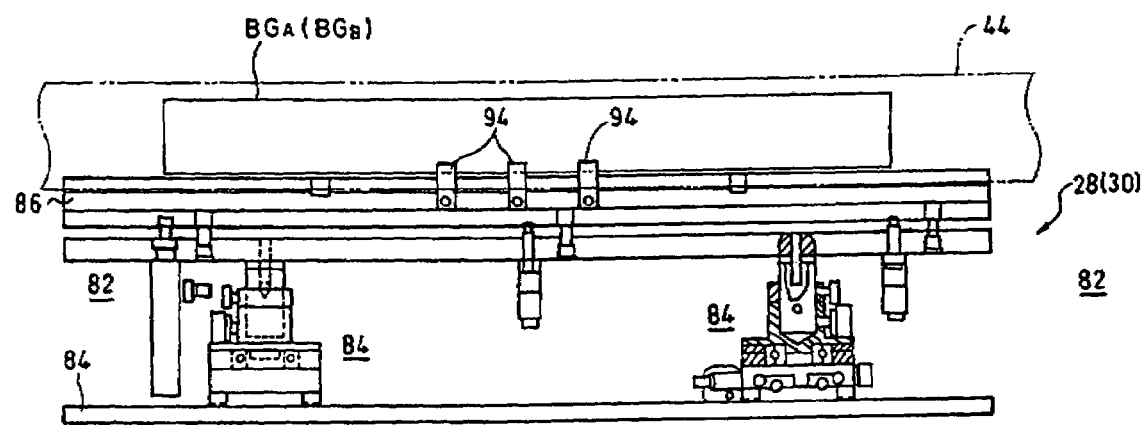

For this purpose, the present embodiment comprises stages 28 and 30 each of which is shown in FIG. 4. FIG. 4 (A) shows each stage 28 (30) viewed from the upper direction, and FIG. 4 (B) is the stage 28 viewed from the side.

As shown in this figure, each stage 28 (30) has a base 84 and a top plate 86 to hold a block gauge, respectively.

Figure 5A:
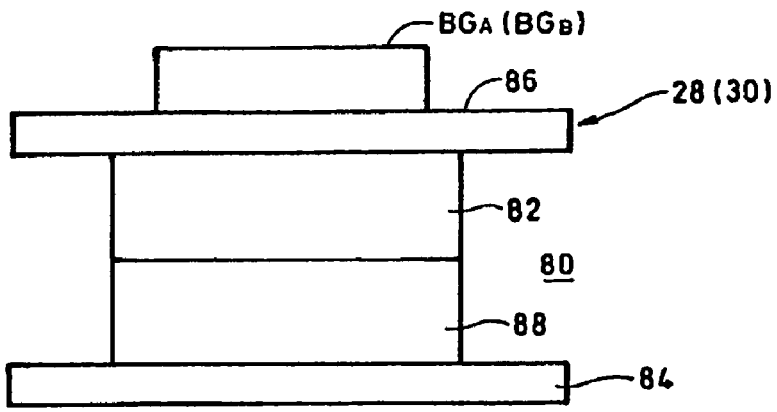
FIG. 5 is an illustration of an adjustor of the stage shown in FIG. 4.
Figure 5B:
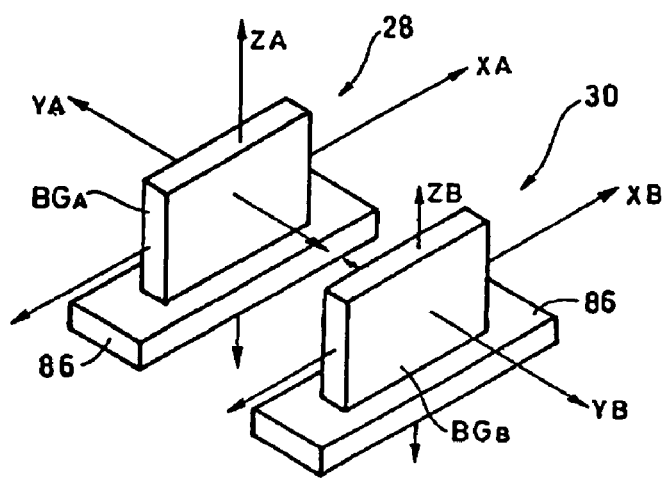
Figure 5C:
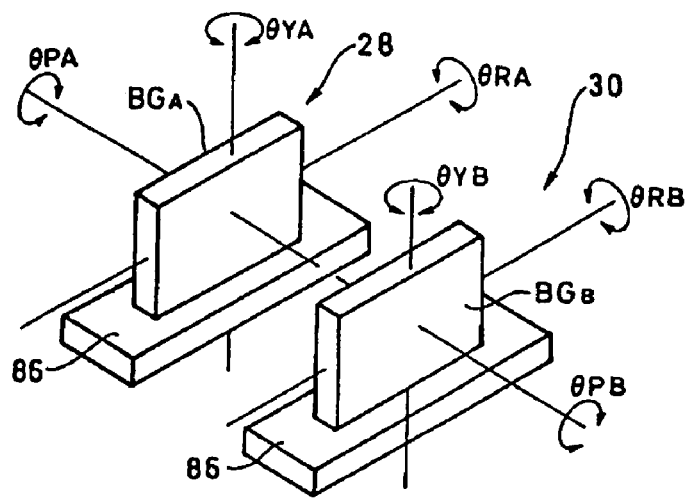

In the present embodiment, each stage has an adjustor 80 as shown in FIG. 5 (A) in order to adjust finely the posture of the block gauge mounted thereon independently.

The adjustor 80 shown in this figure comprises a posture adjustor 82.

The posture adjustor 82 enables change in the inclination of the top plate 86 to the base 84, and adjusts the posture (yawing angle $\theta_{YA}$, pitching angle $\theta_{PA}$, rolling angle $\theta_{RA}$) of the block gauge to the measuring optical path.

Moreover, in the present embodiment, each stage has a stage dislocating device 88 as the adjustor 80, respectively.

The stage dislocating device 88 is placed between the base 84 and the top plate 86, for example, between the base 84 and the posture adjustor 82. It dislocates the top plate 86 against the base 84 in the height direction (Z direction) and in the horizontal direction (XY direction) to adjust roughly the position in the XYZ direction of the block gauge to the measuring optical path of the optical interferometer without wringing.

As a result, each block gauge is positioned at a predetermined location and in a predetermined posture to the measuring optical path by the posture adjustor 82 or the dislocating device 88 on each stage 28 (30).

In the present embodiment, first the coarse adjustment of the block gauge location to the measuring optical path is carried out, and next, the block gauge is finely tuned to the measuring optical path by adjusting the posture of the block gauge.

That is, as shown in FIG. 5 (B), the stage dislocating device 88 moves the top plate 86 in the height direction (the Z direction) and in the horizontal direction (the XY direction), to carry out the coarse adjustment of the location in the height direction (the Z direction) and in the horizontal direction (the XY direction) of the block gauge to the measuring optical path.

After completion of the coarse adjustment, as shown in FIG. 5 (C), the posture adjustor adjusts the inclination of the top plate 86 to finely tune the yawing angle $\theta_{YA}$, the pitching angle $\theta_{PA}$, and the rolling angle $\theta_{RA}$.

In this way, the stages are configured with a combination of two stages which can tune yawing (right and left swaying in the horizontal plane), pitching (vertical swaying orthogonal to the optical path), and rolling (swaying from side to side) finely.

Here, in the present embodiment, above adjustment is performed independently for each stage. Thus, by mounting a block gauge on each stage and making the independent posture adjustment possible, alignment of the optical axes can be independently conducted.

Conventionally two block gauges are held on one stage, which makes the measurement restricted by the locating positions and the arrangement conditions of the block gauges $BG_A$ and $BG_B$. On the other hand, in the present embodiment, one stage is prepared for each of the block gauges and posture adjustment of each stage is carried out independently. For this reason, the wringing operation at the time of size difference measurement becomes completely unnecessary, and alignment of the two block gauges $BG_A$ and $BG_B$ are appropriately done without being restricted by the locating positions and the arrangement states of the two block gauges $BG_A$ and $BG_B$.

As a result, in the present embodiment, since the two block gauges can be set appropriately and easily to the measuring optical path of the optical interferometer without wringing, the size difference measurement between the two block gauges $BG_A$ and $BG_B$ can be performed with higher accuracy, without being restricted by the locating positions and the arrangement states of the two block gauges $BG_A$ and $BG_B$.

(2) Equalization of Measuring Environments

In order to measure the temperature of the block gauge, plural temperature sensors are integrated on the stage. These temperature sensors have dislocating devices for dislocation thereof in the longitudinal direction of the block gauge for measuring the temperatures of the block gauges with a short nominal size to a long nominal one. The temperatures of the block gauges, between which the size difference is measured, need to be made equal as much as possible. Thus it is extremely preferable that the top plates of the stages to which the block gauges contact directly, are connected thermally with each other by a thermal connection member having high heat conductivity so that the heat can easily be transferred. Since each stage has to carry out posture adjustment independently, it is extremely preferable that the thermal connection member has, for example, a shape which does not disturb the motion of each stage.

These are explained specifically below.

<Temperature Sensor>

That is, further equalization of measurement environment is also very important for further enhanced accuracy of the size difference measurement according to the present embodiment, and for this purpose, it is also preferable that the above mentioned stage also has the following temperature sensor.

Figure 6:
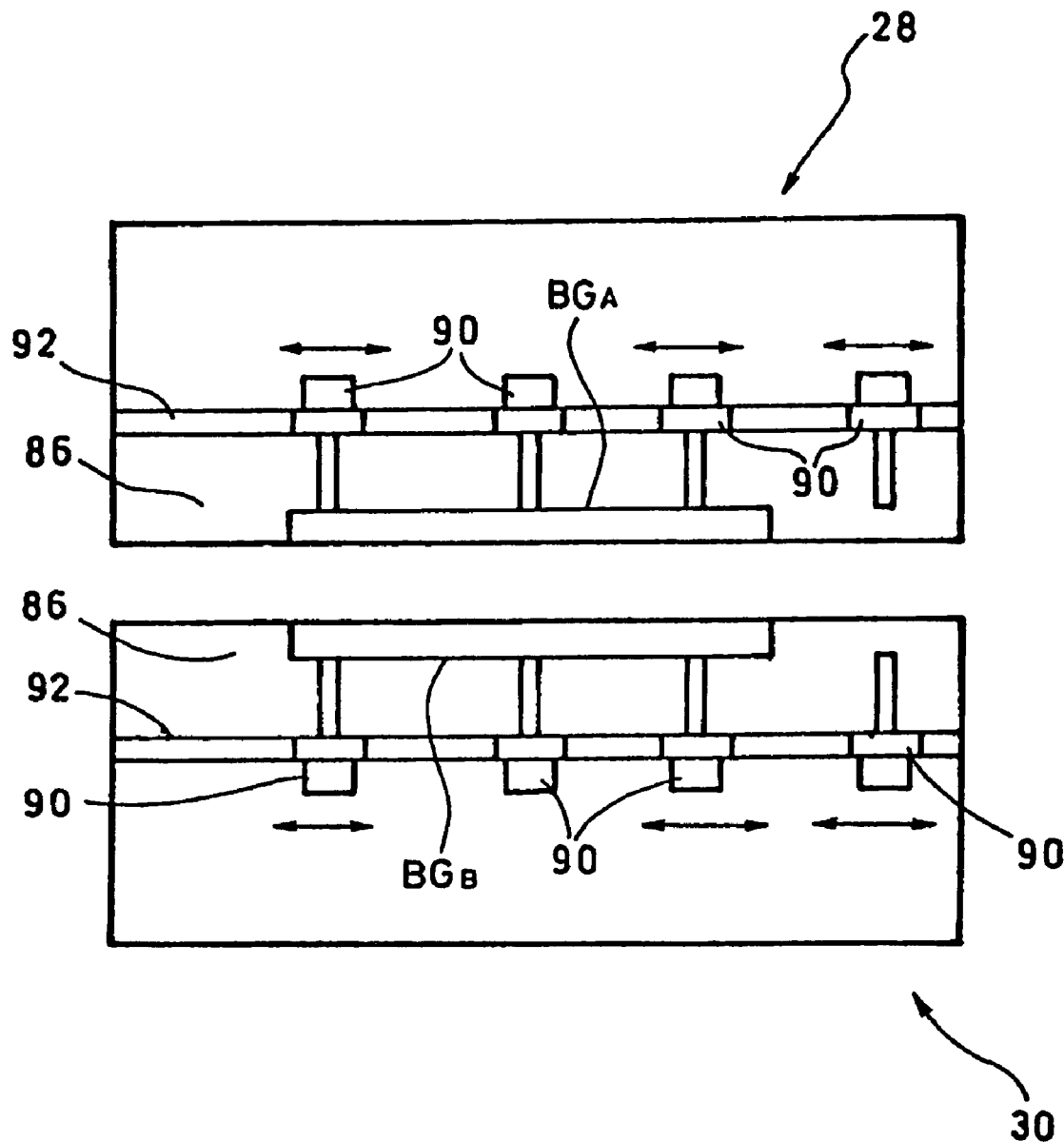
FIG. 6 is an illustration of temperature sensors on the stage shown in FIG. 4.

The outline configuration of each stage equipped with plural temperature sensors is shown in FIG. 6.

As shown in this figure, each of the stages 28 and 30 has plural temperature sensors 90 and sensor dislocating devices 92, such as a straight rail, respectively.

Here, the plural temperature sensors 90 are arranged with separations in the longitudinal direction of the block gauge, and measure the temperatures of plural positions of the block gauge.

The sensor dislocating devices 92 can freely move the temperature sensors 90 in the longitudinal direction of the block gauge.

Each temperature sensor 90 contacts or approaches the side wall of the block gauge, and outputs the temperature of the side wall of the block gauge.

In this way, each stage includes plural temperature sensors 90 and has the sensor dislocating devices which dislocates these temperature sensors 90 freely in the longitudinal direction of the block gauge, and as a result, the temperature measurement of the short block gauge to the long block gauge at plural positions is possible.

Here, it is conventionally contemplated to use one temperature sensor for one block gauge. On the other hand, in the present embodiment, in order to reduce substantially the uncertainty of measurement due the temperature environment, plural temperature sensors are used for one stage, i.e., for one block gauge. Therefore, in the present embodiment, for every block gauge, the temperatures at plural locations are measured according to its length, and the temperature of the corresponding block gauge is estimated based on the measured temperatures at the plural locations. By using the measured temperatures obtained in this way, conversion of the size of the block gauge at the measured temperature which may be shifted from the standard temperature, to the size at the standard temperature can be performed more appropriately. In the present embodiment, since the uncertainty of measurement due to temperature environment can be substantially reduced, the size difference measurement between the block gauges can be performed with higher degree of accuracy.

<Top Plate>

For further enhanced accuracy of the size difference measurement in the present embodiment, further equalization of measurement environment is also very important, and thus it is especially preferable to use, as the above-mentioned stage, one equipped with the following top plate 86.

Figure 7A:
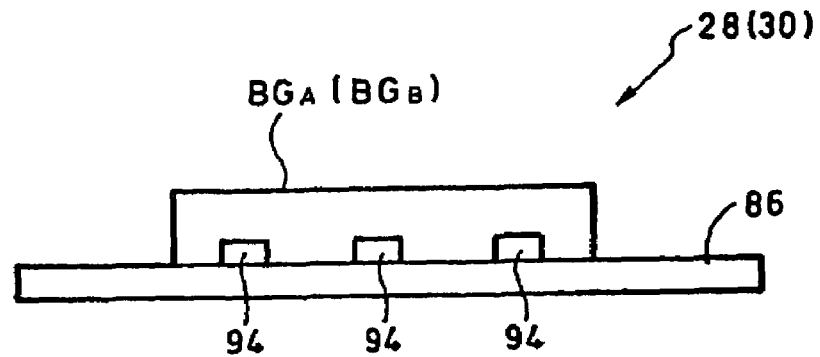
FIG. 7 is an illustration of the outline configuration of a top plate of the stage shown in FIG. 4.
Figure 7B:
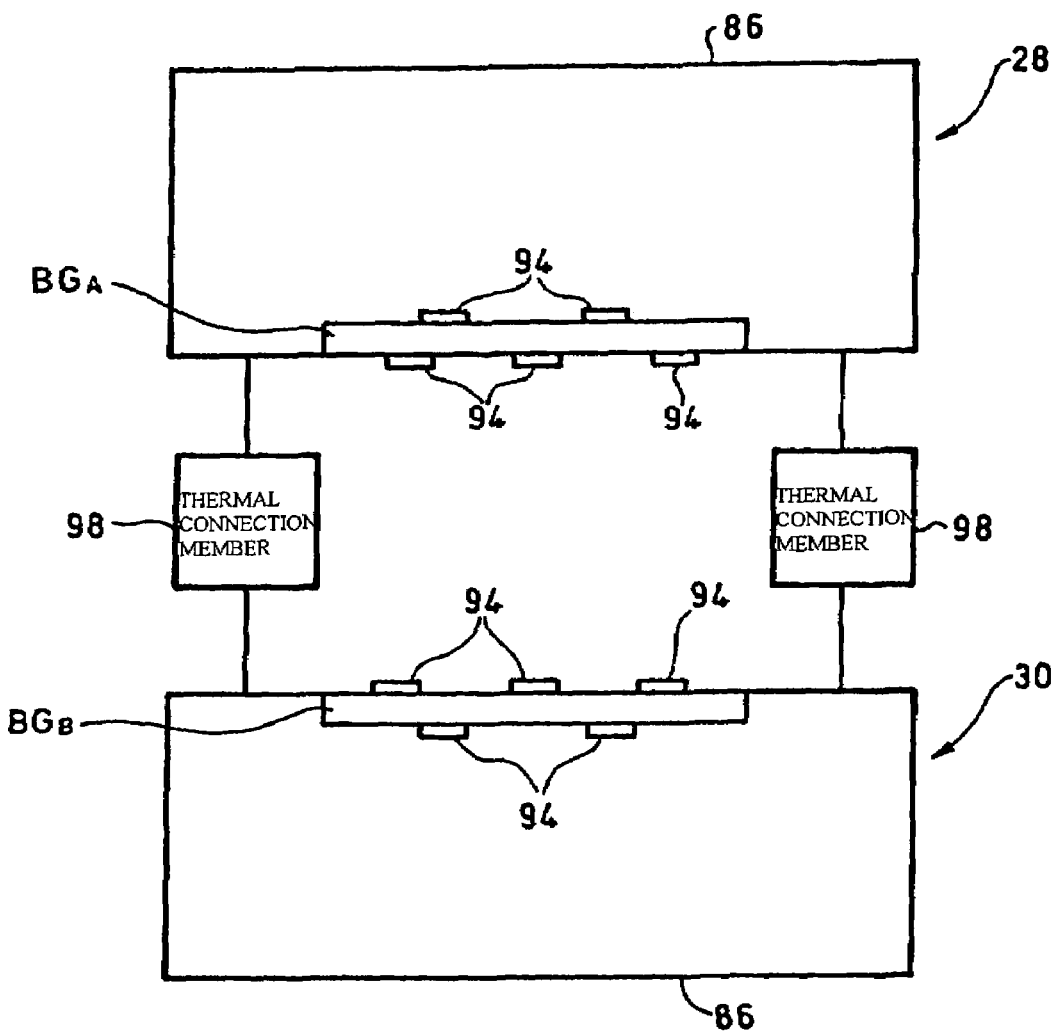

In FIG. 7, an outline configuration of a top plate 86 on which a block gauge is held is shown.

FIG. 7 (A) is the above configuration viewed from the side, and FIG. 7 (B) is the one viewed from the upper direction.

The top plate 86 shown in this figure has high heat conductivity and holds a block gauge.

Here, the block gauge is held through support feet provided, for example, at two locations on the top plate, instead of being directly put on the top plate.

And in the present embodiment, the top plate 86 has support members 94 which support the block gauge from both sides of the side walls. The support members 94 also are made of the same material as the top plate 86, and have high heat conductivity.

Such a top plate 86 is prepared for every stage 28 and 30.

Constituting the top plate 86 by a material having high thermal conductivity, occurrence of portions with different temperature from other portions in a block gauge can be avoided, and the temperature in each portion in a block gauge can be made as equal as possible. Thereby, the uncertainty of measurement due to the environment can be reduced substantially, and the size difference can be measured with high accuracy.

Since the top plate 86 has support members 94 which support the block gauge from both sides of the side walls to suitably hold the block gauge, the size difference measurement between block gauges can be performed appropriately without occurrence of distortion in the length-measurement axis direction which may affect the size measurement.

<Thermal Connection Member>

Moreover, according to the present invention, it is preferable that thermal connection members 98, which have high heat conductivity and connect the top-plates 86 of each of the stages 28 and 30 together, are provided.

The thermal connection members 98 connecting the top plates of each of the stages together and having high heat conductivity can make the temperatures of the two block gauges as equal as possible. Thereby the sizes of the two block gauges can be measured under more similar environment, so that the uncertainty of measurement due to the environment can be reduced substantially, and the size difference between the two block gauges can be measured with high accuracy.

Here, according to the present invention, the thermal connection member 98 suitably has one or more shapes selected from the group consisting of a linear shape, a sheet-like shape, a bellows-like shape, and a mesh-like shape, so that the independent motion of each stage 28 or 30 may not be disturbed at the setting step, that is, when the position or the posture of the block gauge is being adjusted to the measuring optical path.

In the present embodiment, the thermal connection member 98 is line-shaped and the two top-plates 86 are thermally connected with each other by the linear thermal connection members 98.

As a result, the disturbance by the thermal connection member 98 that affects the independent motion of each stage 28 or 30 can be substantially reduced. Thus, the uncertainty of measurement due to the environment can be reduced largely by the thermal connection member 98, without disturbing the independent alignment by each stage 28 or 30. Thereby, the reduction of the uncertainty of measurement due to the environment by the thermal connection member and the independent alignment by each stage 28 and 30 can be reconciled on a very high level.

In this way, the present embodiment can carry out size difference measurement between the two block gauges by setting each of the two block gauges, together with each stage, in the measuring optical path for the block gauge of the optical interferometer without wringing, performing size measurement simultaneously, and computing the difference. According to the present embodiment, since wringing of the block gauge with the base plate is unnecessary at the time of size measurement, the measurement is released from restriction of the wringing location, uniformity of the wringing condition, skills for the operation, and the like peculiar to the wringing measurement. Moreover, highly accurate measurement can be realized easily and the improvement in workability of measurement can also be aimed at.

Thus, the present embodiment can reduce the uncertainty of the size difference measurement between the two block gauges, and the size difference measurement between the two block gauges can be performed simply and with high accuracy.

Modifications

In addition, the present invention can be applied to the measurement of the size difference or thermal expansion coefficients of not only the end standards, such as the above described block gauges, but also to other objects, if the surface precision and the parallelism of their opposing end faces are good enough for interferometric length measurement and the cross-sectional areas of their end faces are smaller than the beam diameter of the measuring light.

<Thermal Connection Member>

Although an example using a linear thermal connection member 98 was explained in the above mentioned configuration, the present invention is not limited to this, and if the member has the shape which does not disturb the independent motions of the two stages, the members in other shapes can be used.

Figure 8A:
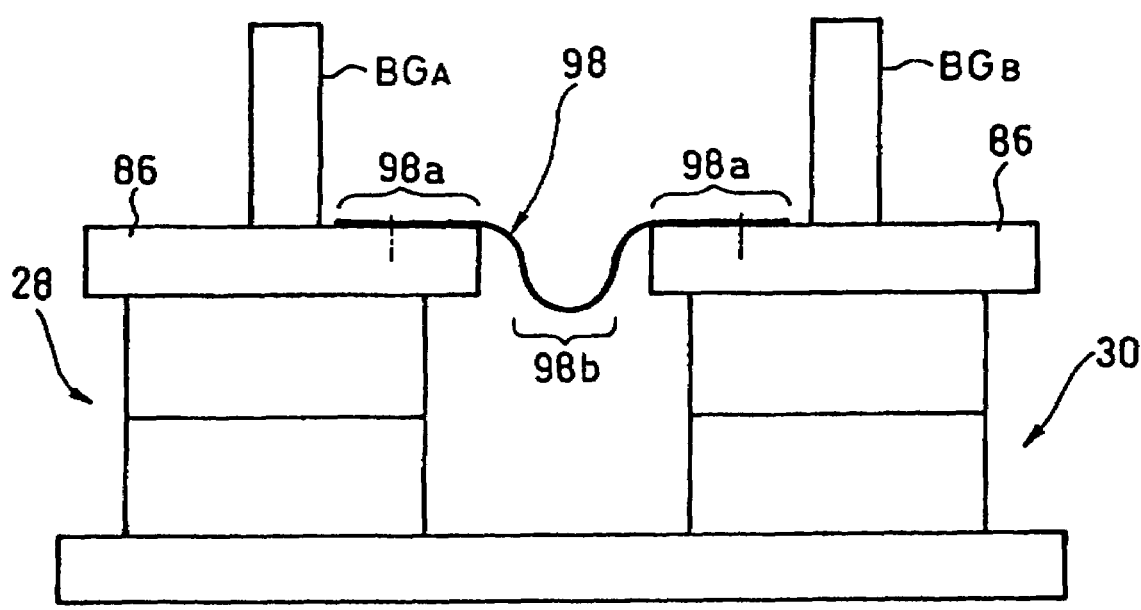
FIG. 8 is an illustration of a thermal connection member used suitably for the stages shown in FIG. 4.
Figure 8B:
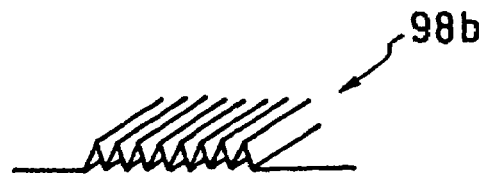

For example, the member as shown in FIG. 8 (A) is preferable to be used.

In this figure, a sheet-like member having high heat conductivity, a highly heat-conductive graphite sheet for example, is used as the thermal connection member 98.

Here, the sheet-like thermal connection member 98 is cut in larger size than the distance between the two top plates 86 in order not to disturb the motions of stages 28 and 30 with certainty.

Moreover, the sheet-like thermal connection member 98 connects two stages 28 and 30 together in a slack condition between the top plates 86.

And in order to perform good heat conduction between the top plates 86, the sheet-like thermal connection member 98 has top plate contacting margins 98a which are contacting parts with the top plates 86 and are prepared for each of the top plates 86.

By such a thermal connection member 98, heat conduction between the top plates 86 can be made preferable.

Moreover, the thermal connection member 98 connects two stages 28 and 30 in a slack condition between the top plates 86, which certainly prevents the member from disturbing the motion of stages 28 and 30.

It is also preferable to make the slack portion 98b of the thermal connection member 98 into bellows-like shape as shown in FIG. 8 (B), i.e. to make the sheet-like thermal connection member 98 into a shape with repeated mountain fold and valley fold in a suitable width. Thereby, the elasticity of the thermal conduction member 98 between two stages 28 and 30 is increased substantially, and thus disturbance of the motion of stages 28 and 30 can be more certainly prevented.

It is also preferable to make the slack portion 98b of the thermal connection member 98 into mesh structure which is excellent with respect to elasticity.

What is claimed is:

1. A size difference measuring method comprising:
    an optical interference measuring step without wringing, of obtaining, through simultaneous measurement of interference fringes, size information relating to at least two end standards $BG_A$ and $BG_B$ which are set in parallel in the measuring optical path between a first interferometer and a second interferometer, by an optical interferometer without wringing that comprises: one light emitter that emits coherent light; a beam splitter; the first interferometer and the second interferometer which are arranged with predetermined separation interval between them and each of which has an optical axis in agreement with the length-measurement axes of at least two end standards $BG_A$ and $BG_B$ having known preliminary values; and a first interference fringe observation device and a second interference fringe observation device; and
    a computing step of computing a difference of a size $L_A$, which is the length between the opposing end faces of the end standard $BG_A$ and can be expressed by formula 24 below, and a size $L_B$, which is the length between the opposing end faces of the end standard $BG_B$ and can be expressed by formula 25 below, (the size difference $\Delta L_{AB} = L_B - L_A$), based on the interference fringe phase differences acquired as the size information of the end standards $BG_A$ and $BG_B$ at the optical interference measuring without wringing step $$L_A = \lambda/2\{N_A + (\epsilon_{A4} - \epsilon_{A3}) + (\epsilon_{A2} - \epsilon_{A1})\},\quad \text{(Formula 24)}$$

where $\lambda$: wave length of the interference light,
    $N_A$: the integer part of the quotient obtained by dividing the size $L_A$ of the end standard $BG_A$ by $\lambda/2$,
    $(\epsilon_{A2} - \epsilon_{A1})$: phase difference between the reference interference fringe and the measured interference fringe relating to one end face of the end standard $BG_A$, observed by the first interference fringe observation device,
    $(\epsilon_{A4} - \epsilon_{A3})$: phase difference between the reference interference fringe and the measured interference fringe relating to the other end face of the end standard $BG_A$ observed by the second interference fringe observation device, $$L_B = \lambda/2\{N_B + (\epsilon_{B4} - \epsilon_{B3}) + (\epsilon_{B2} - \epsilon_{B1})\},\quad \text{(Formula 25)}$$

where $\lambda$: wave length of the interference light,
    $N_B$: the integer part of the quotient obtained by dividing the size $L_B$ of the end standard $BG_B$ by $\lambda/2$,
    $(\epsilon_{B2} - \epsilon_{B1})$: phase difference between the reference interference fringe and the measured interference fringe relating to one end face of the end standard $BG_B$, observed by the first interference fringe observation device,
    $(\epsilon_{B4} - \epsilon_{B3})$: phase difference between the reference interference fringe and the measured interference fringe relating to the other end face of the end standard $BG_B$, observed by the second interference fringe observation device.

2. The size difference measuring method according to claim 1 comprising a setting step provided prior to the optical interference measuring step without wringing, wherein
    the setting step performs adjustment of the posture or the position of the end standard to the measuring optical path of the optical interferometer without wringing, by a stage which is provided for each of the end standard individually and adjusts the posture or position of the end standard held thereon, independently for each stage.

3. A size difference measuring apparatus comprising:
    an optical interferometer without wringing, which obtains, through simultaneous measurement of interference fringes, size information relating to at least two end standards $BG_A$ and $BG_B$ arranged in the optical measurement path in parallel between a first interferometer and a second interferometer and which comprises: one light emitter that emits coherent light; a beam splitter; the first interferometer and the second interferometer which are arranged with predetermined separation and each of which has the optical axis in agreement with the length-measurement axes of the end standards $BG_A$ and $BG_B$ having known preliminary values; and a first interference fringe observation device and a second interference fringe observation device; and a computing unit that computes a difference of a size $L_A$, which is the length between the opposing end faces of the end standard $BG_A$, and a size $L_B$, which is the length between the opposing end faces of the end standard $BG_B$, based on the interference fringe phase differences acquired as the size information of the end standards $BG_A$ and $BG_B$ by the optical interferometer without wringing, wherein:

the light emitter sends onto the beam splitter coherent light having a beam diameter determined based on the magnitude of the end face of each of the end standards;

the beam splitter halves the coherent light from the light emitter, and sends one part onto the first interferometer, and the other part to the second interferometer;

the first interferometer sends a part of coherent light from the beam splitter onto one end of each of the end standards where the light is reflected and returned, and sends the remainder onto the second interferometer through the side of each of the end standards;

the second interferometer sends a part of coherent light from the beam splitter onto the other end of each of the end standards where the light is reflected and returned, and sends the remainder onto the first interferometer through the side of each of the end standards;

the first interferometer superimposes the coherent light sent from the second interferometer, which have passed through the side of each of the end standards, over the first reference light to obtain a standard interference light, and also superimposes each reflected light, obtained by sending the coherent light from the first interferometer onto one end of each of the end standards, over the first reference light to obtain each measured interference light;

the second interferometer superimposes the coherent light sent from the first interferometer, which have passed through the side of each of the end standards, over the second reference light to obtain a standard interference light, and also superimposes each reflected light, obtained by sending the coherent light from the second interferometer onto the other end of each of the end standards, over the second reference light to obtain each measured interference light;

the first interference fringe observation device observes simultaneously the standard interference light and each measured interference light which are obtained by the first interferometer, as interference fringes, respectively;

the second interference fringe observation device observes, simultaneously with the interference fringe observation by the first interference fringe observation device, the standard interference light and each measured interference light which are obtained by the second interferometer, as interference fringes, respectively; and the computing unit computes a difference of the size $L_A$, which is the length between the opposing end faces of the end standard $BG_A$ and is expressed with the following formula 26, and the size $L_B$, which is the length between the opposing end faces of the end standard $BG_B$ and is expressed with the following formula 27, (the size difference $\Delta L_{AB} = L_B - L_A$), based on the interference fringe phase differences acquired as size information of the end standards $BG_A$ and $BG_B$ by the optical interferometer without wringing $$L_A = \lambda/2\{N_A + (\epsilon_{A4} - \epsilon_{A3}) + (\epsilon_{A2} - \epsilon_{A1})\}, \quad \text{(Formula 26)}$$

where $\lambda$: wave length of the interference light;

$N_A$: the integer part of the quotient obtained by dividing size $L_A$ of the end standard $BG_A$ by $\lambda/2$;

$(\epsilon_{A2} - \epsilon_{A1})$: phase difference between the reference interference fringe and the measured interference fringe relating to one end face of the end standard $BG_A$ observed by the first interference fringe observation device;

$(\epsilon_{A4} - \epsilon_{A3})$: phase difference between the reference interference fringe and the measured interference fringe relating to the other end face of the end standard $BG_A$ observed by the second interference fringe observation device, $$L_B = \lambda/2\{N_B + (\epsilon_{B4} - \epsilon_{B3}) + (\epsilon_{B2} - \epsilon_{B1})\}, \quad \text{(Formula 27)}$$

where $\lambda$: wave length of the interference light, $N_B$: the integer part of the quotient obtained by dividing size $L_B$ of the end standard $BG_B$ by $\lambda/2$, $(\epsilon_{B2} - \epsilon_{B1})$: phase difference between the reference interference fringe and the measured interference fringe relating to one end face of the end standard $BG_B$ observed by the first interference fringe observation device, $(\epsilon_{B4} - \epsilon_{B3})$: phase difference between the reference interference fringe and the measured interference fringe relating to the other end face of the end standard $BG_B$ observed by the second interference fringe observation device.

4. The size difference measuring apparatus according to claim 3 comprising one stage for each of the end standards individually, wherein the stage adjusts the posture or position of the end standard held thereon, and each of the stages comprises:

a base, a top plate which holds the end standard, and an adjustor that enables free motion of the top plate relative to the base and adjusts the posture or position of the end standard to the measuring optical path of the optical interferometer without wringing, wherein the adjustment of the posture or the position of each of the end standards to the measuring optical path of the optical interferometer without wringing is performed independently for each of the stages.

5. The size difference measuring apparatus according to claim 4, wherein, the adjustor adjusts, as posture adjustment, yawing angle in horizontal direction, pitching angle in longitudinal direction, or rolling angle in lateral direction of the end standard to the measuring optical path of the optical interferometer without wringing.

6. The size difference measuring apparatus according to claim 4, wherein the each stage comprises:

plural temperature sensors which are arranged along the longitudinal direction of the end standard with a separating distance to measure the temperature of plural points of the end standard, and sensor dislocating devices enabling free dislocating of the temperature sensor in the longitudinal direction of the end standard, wherein the temperature at plural points of the end standard according to the length thereof are measured for each end standard individually and the temperature of the end standard is estimated based on the measured temperature at the plural points thereof.

7. The size difference measuring apparatus according to claim 5, wherein the each stage comprises:

plural temperature sensors which are arranged along the longitudinal direction of the end standard with a separating distance to measure the temperature of plural points of the end standard, and sensor dislocating devices enabling free dislocating of the temperature sensor in the longitudinal direction of the end standard, wherein the temperature at plural points of the end standard according to the length thereof are measured for each end standard individually and the temperature of the end standard is estimated based on the measured temperature at the plural points thereof.

8. The size difference measuring apparatus according to claim 4, wherein the top plate has high heat conductivity so that the temperature of each part of the end standard held on the top plate becomes equal.

9. The size difference measuring apparatus according to claim 5, wherein the top plate has high heat conductivity so that the temperature of each part of the end standard held on the top plate becomes equal.

10. The size difference measuring apparatus according to claim 6, wherein the top plate has high heat conductivity so that the temperature of each part of the end standard held on the top plate becomes equal.

11. The size difference measuring apparatus according to claim 7, wherein the top plate has high heat conductivity so that the temperature of each part of the end standard held on the top plate becomes equal.

12. The size difference measuring apparatus according to claim 8 comprising thermal connection members which connect the top plates of the stages respectively and have high heat conductivity so that the temperature of each of the end standards becomes equal.

13. The size difference measuring apparatus according to claim 9 comprising thermal connection members which connect the top plates of the stages respectively and have high heat conductivity so that the temperature of each of the end standards becomes equal.

14. The size difference measuring apparatus according to claim 10 comprising thermal connection members which connect the top plates of the stages respectively and have high heat conductivity so that the temperature of each of the end standards becomes equal.

15. The size difference measuring apparatus according to claim 11 comprising thermal connection members which connect the top plates of the stages respectively and have high heat conductivity so that the temperature of each of the end standards becomes equal.

16. The size difference measuring apparatus according to claim 12, wherein the thermal connection member has one or more shapes selected from the group consisting of sheet-like shape, mesh-like shape, bellows-like shape, linear shape, so that the independent motion of each of the stages by the adjustor is not disturbed.

17. The size difference measuring apparatus according to claim 13, wherein the thermal connection member has one or more shapes selected from the group consisting of sheet-like shape, mesh-like shape, bellows-like shape, linear shape, so that the independent motion of each of the stages by the adjustor is not disturbed.

18. The size difference measuring apparatus according to claim 14, wherein the thermal connection member has one or more shapes selected from the group consisting of sheet-like shape, mesh-like shape, bellows-like shape, linear shape, so that the independent motion of each of the stages by the adjustor is not disturbed.

19. The size difference measuring apparatus according to claim 15, wherein the thermal connection member has one or more shapes selected from the group consisting of sheet-like shape, mesh-like shape, bellows-like shape, linear shape, so that the independent motion of each of the stages by the adjustor is not disturbed.

* * * * *